Nov. 28, 1944.    A. WARMISHAM ET AL    2,363,712
OPTICAL OBJECTIVE
Original Filed Dec. 15, 1941
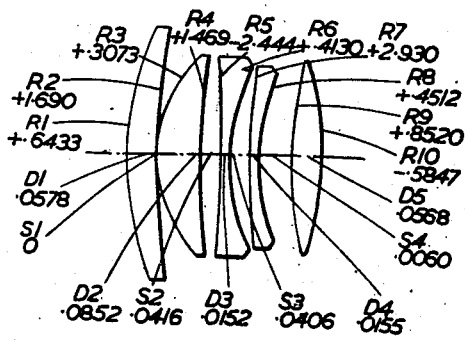

Patented Nov. 28, 1944

2,363,712

UNITED STATES PATENT OFFICE 2,363,712

OPTICAL OBJECTIVE

Arthur Warmisham and Charles Gorrie Wynne, Leicester, England, assignors to Taylor, Taylor & Hobson Limited, Leicester, England, a company of Great Britain Original application December 15, 1941, Serial No. 423,118. Divided and this application April 24, 1943, Serial No. 484,424. In Great Britain December 2, 1940

6 Claims. (Cl. 88—57)

This application is divisional from application Serial No. 423,118, filed December 15, 1941, and which has become United States Patent No. 2,319,171, dated May 11, 1943.

The invention of such prior application relates to optical objectives for photographic or like purposes, comprising two or more divergent elements and two or more convergent elements, and corrected for spherical and chromatic aberrations, coma, astigmatism, curvature of field and distortion, and having small zonal spherical aberration. The present invention is concerned with an objective of such kind having five axially aligned components each in the form of simple elements, three of the components being convergent and disposed two on one side and one on the other side of the remaining two components which are divergent.

Like the invention of the prior application, the present invention has for its object to provide good correction for secondary spectrum without sacrificing correction for astigmatism, field curvature and distortion, and to this end employs an alkaline halide crystal for one of its divergent elements, the remaining four elements being of optical glass, the objective approximately fulfilling the two equations $$\sum \frac{m^2_p}{f_p} \cdot \frac{1}{V_p} = 0$$

and $$\sum \frac{m^2_p}{f_p} \cdot \frac{\theta_p}{V_p} = 0$$

wherein $m_p$, $f_p$, $V_p$ and $\theta_p$ respectively represent the magnification, the focal length, the Abbé $\nu$ number and the relative partial dispersion of an element $p$ of the objective, and the symbol $\Sigma$ indicates algebraical summation of the expressions for all the elements of the objective. It should be made clear that the magnification $m_p$ herein referred to, may be defined as being equal to the ratio $h_p/h_1$, where $h_p$ and $h_1$ are respectively the ordinates of the point of intersection with the lens element $p$ and with the first lens element of a paraxial ray of the wave-length of the D-line through the conjugate points for which the objective is corrected, and also that $V_p$ and $\theta_p$ have their usual significance, namely $$V_p = \frac{n_D - 1}{n_F - n_C}$$

and $$\theta_p = \frac{n_g - n_e}{n_F - n_C}$$

where $n_C$, $n_D$, $n_e$, $n_F$ and $n_g$ are respectively the refractive indices of the element $p$ for the lines C, D, e, F, and g.

In the case when the front two components and the rear component are convergent, and the third and fourth components divergent, the divergent fourth element is preferably made of an alkaline halide crystal having mean refractive index greater than 1.6, optical glass being used for the remaining elements. The divergent third element is then preferably made of dense flint glass, at least one of the convergent elements being made of a glass having an Abbé $\nu$ number less than 50.

It is to be understood that the terms "front" and "rear" are herein used to relate to the sides of the objective respectively nearer to and further from the longer conjugate in accordance with the usual convention.

The accompanying drawing shows one convenient practical example according to the invention, and numerical data for this example are given in the following table, in which $R_1$ $R_2$ ... represent the radii of curvature of the individual lens surfaces counting from the front, the positive sign indicating that the surface is convex to the front and the negative sign that it is concave thereto, $D_1$ $D_2$ ... represent the axial thicknesses of the individual lens elements, and $S_1$ $S_2$ ... represent the axial lengths of the air gaps between the components. The table also gives the mean refractive indices $n_D$, the Abbé $\nu$ numbers and the relative partial dispersions of the materials used for the individual elements.

Equivalent focal length 1.000    Relative aperature F/2.5

| Radius | Thickness or separation | Refractive index $n_D$ | Abbé $\nu$ number | Relative partial dispersion $\frac{e-g}{C-F}$ |
|---|---|---|---|---|
| $R_1 + .6433$ | $D_1 = .0578$ | 1.644 | 48.3 | 1.025 |
| $R_2 + 1.690$ | $S_1 = 0$ | | | |
| $R_3 + .3707$ | $D_2 = .0852$ | 1.613 | 53.3 | 1.016 |
| $R_4 + 1.469$ | $S_2 = .0416$ | | | |
| $R_5 - 2.444$ | $D_3 = .0152$ | 1.652 | 33.5 | 1.060 |
| $R_6 + .4130$ | $S_3 = .0406$ | | | |
| $R_7 + 2.930$ | $D_4 = .0155$ | 1.641 | 29.9 | .985 |
| $R_8 + .4512$ | $S_4 = .0660$ | | | |
| $R_9 + .8520$ | $D_5 = .0568$ | 1.644 | 48.3 | 1.025 |
| $R_{10} - .5847$ | | | | |

In this example the convergent front and rear elements are made of dense barium flint glass and the convergent second element is made of dense barium crown glass. The divergent fourth element is made of sodium bromide crystal and the divergent third element is made of dense flint glass.

What we claim as our invention and desire to secure by Letters Patent is:

1. An optical objective corrected for spherical and chromatic aberrations, coma, astigmatism, field curvature and distortion and having small zonal spherical abberation, and comprising five axially aligned components each in the form of a simple element, of which two components are divergent and the other three are convergent and are disposed two on one side and one on the other side of the two divergent components, one of the divergent components being made of an alkaline halide crystal and the other four components of optical glass, the objective approximately fulfilling the two equations $$\sum \frac{m^2_p}{f_p} \cdot \frac{1}{V_p} = 0$$

and $$\sum \frac{m^2_p}{f_p} \cdot \frac{\theta_p}{V_p} = 0$$

wherein $m_p$, $f_p$, $V_p$ and $\theta_p$ respectively represent the magnification, the focal length, the Abbé $\nu$ number and the relative partial dispersion of an element $p$ of the objective and the symbol $\Sigma$ indicates algebraical summation of the expressions for all the elements of the objective.

2. An optical objective as claimed in claim 1, in which the other divergent component is made of dense flint glass, and at least one of the convergent components is made of a glass having Abbé $\nu$ number less than 50.

3. An optical objective, corrected for spherical and chromatic aberrations, coma, astigmatism, field curvature and distortion and having small zonal spherical aberration, and comprising five axially aligned components each in the form of a simple element, of which the front two components and the rear component are convergent and the third and fourth components are divergent the divergent fourth component being made of an alkaline halide crystal having mean refractive index greater than 1.6 and the other four components of optical glass, the objective approximately fulfilling the two equations $$\sum \frac{m^2_p}{f_p} \cdot \frac{1}{V_p} = 0$$

and $$\sum \frac{m^2_p}{f_p} \cdot \frac{\theta_p}{V_p} = 0$$

wherein $m_p$, $f_p$, $V_p$ and $\theta_p$ respectively represent the magnification, the focal length, the Abbé $\nu$ number and the relative partial dispersion of an element $p$ of the objective and the symbol $\Sigma$ indicates summation of the expressions for all the elements of the objective.

4. An optical objective as claimed in claim 3, in which the divergent third element is made of dense flint glass and at least one of the convergent elements is made of a glass having an Abbé $\nu$ number less than 50.

5. An optical objective as claimed in claim 3, in which the convergent front and rear elements are made of dense barium flint glass and the convergent second element is made of dense barium crown glass, whilst the divergent third and fourth elements are made respectively of dense flint glass and of sodium bromide crystal.

6. An optical objective having numerical data substantially as set forth in the following table:

Equivalent focal length 1.000      Relative aperture F/2.5

| Radius | Thickness or separation | Refractive index $n_D$ | Abbé $\nu$ number | Relative partial dispersion $\frac{e-g}{C-F}$ |
|---|---|---|---|---|
| $R_1+ .6433$ | | | | |
| | $D_1 = .0578$ | 1.644 | 48.3 | 1.025 |
| $R_2+1.690$ | | | | |
| | $S_1 = 0$ | | | |
| $R_3+ .3707$ | | | | |
| | $D_2 = .0852$ | 1.613 | 53.3 | 1.016 |
| $R_4+1.469$ | | | | |
| | $S_2 = .0416$ | | | |
| $R_5-2.444$ | | | | |
| | $D_3 = .0152$ | 1.652 | 33.5 | 1.060 |
| $R_6+ .4130$ | | | | |
| | $S_3 = .0406$ | | | |
| $R_7+2.930$ | | | | |
| | $D_4 = .0155$ | 1.641 | 29.9 | .985 |
| $R_8+ .4512$ | | | | |
| | $S_4 = .0660$ | | | |
| $R_9+ .8520$ | | | | |
| | $D_5 = .0568$ | 1.644 | 48.3 | 1.025 |
| $R_{10}- .5847$ | | | | | wherein $R_1$ $R_2$ ... indicate the radii of the individual surfaces counting from the front, $D_1$ $D_2$ ... indicate the axial thicknesses of the individual elements and $S_1$ $S_2$ ... indicate the axial air separations between the components.

ARTHUR WARMISHAM.
CHARLES GORRIE WYNNE.